US012438320B1

(12) United States Patent
Chen

(10) Patent No.: US 12,438,320 B1
(45) Date of Patent: Oct. 7, 2025

(54) ROTATABLE EXTENSION PLUGBOARD

(71) Applicant: Jigan Chen, Guangzhou (CN)

(72) Inventor: Jigan Chen, Guangzhou (CN)

( * ) Notice: Subject to any disclaimer, the term of this patent is extended or adjusted under 35 U.S.C. 154(b) by 0 days.

(21) Appl. No.: 19/000,165

(22) Filed: Dec. 23, 2024

(30) Foreign Application Priority Data

Jul. 1, 2024 (CN) ........................ 202421537845.X

(51) Int. Cl.
*H01R 35/02* (2006.01)
*H01R 35/04* (2006.01)

(52) U.S. Cl.
CPC ............. *H01R 35/02* (2013.01); *H01R 35/04* (2013.01)

(58) Field of Classification Search
CPC ...... H01R 35/02; H01R 35/00; H01R 35/025; H01R 35/04
See application file for complete search history.

(56) References Cited

U.S. PATENT DOCUMENTS 7,435,090 B1 * 10/2008 Schriefer ............... H01R 35/04 439/11
8,262,277 B2 * 9/2012 Hsiao ...................... F21V 23/06 392/386
2008/0268678 A1 * 10/2008 Hsu ........................ H01R 25/00 439/131

FOREIGN PATENT DOCUMENTS

CN 203300926 U * 11/2013
CN 106877061 A 6/2017
CN 208889952 U 5/2019
CN 112054335 A 12/2020

* cited by examiner

*Primary Examiner* — Renee S Luebke
*Assistant Examiner* — Paul D Baillargeon
(74) *Attorney, Agent, or Firm* — Nitin Kaushik

(57) ABSTRACT

A rotatable extension plugboard relates to the technical field of electrical appliances. The rotatable extension plugboard includes a plugboard seat and a plug assembly, where a boss with an inner cavity is formed at a backplane of the plugboard seat, the plug assembly is mounted on the boss through a rotating seat provided on the plug assembly, the rotating seat and the boss form a corresponding limiting tooth and limiting groove, and the plug assembly is rotatable in a limiting manner relative to the plugboard seat through engagement between the limiting tooth and the limiting groove. The plugboard seat and the plug assembly in this design can rotate relatively, so that the extension plugboard has higher environmental compatibility.

5 Claims, 6 Drawing Sheets

ROTATABLE EXTENSION PLUGBOARD

CROSS-REFERENCE TO RELATED APPLICATIONS

The application claims priority to Chinese patent application No. 202421537845X, filed on Jul. 1, 2024, the entire contents of which are incorporated herein by reference.

TECHNICAL FIELD

The present invention relates to an extension plugboard, in particular, to a rotatable extension plugboard, and belongs to the technical field of electrical appliances.

BACKGROUND

At present, there is an extension plugboard in the market, with a structure shown in the patent with a publication number CN203300926U. The extension plugboard has the advantages that the extension plugboard can be directly mounted on a power socket through a plug of a backplane without using a lengthy power cord, which can effectively improve simplicity of indoor space. Certainly, this design has certain shortcomings, for example, there is relatively low environmental compatibility, and there is a requirement for no foreign objects around the power socket to interfere with mounting and use of the power socket.

Therefore, the applicant has designed a rotatable extension plugboard and put forward the following application.

SUMMARY

In view of the shortcomings of the prior art, the present invention provides a rotatable extension plugboard.

To achieve the above objective, the technical solutions used in the present invention are as follows: A rotatable extension plugboard includes a plugboard seat and a plug assembly, where a boss with an inner cavity is formed at a backplane of the plugboard seat, the plug assembly is mounted on the boss through a rotating seat provided on the plug assembly, the rotating seat and the boss form a corresponding limiting tooth and limiting groove, and the plug assembly is rotatable in a limiting manner relative to the plugboard seat through engagement between the limiting tooth and the limiting groove.

Preferably, the limiting groove is formed at a protruding edge of an inner wall of the boss, the plug assembly is provided with a positioning plate mutually fastened with the rotating seat, and the positioning plate and the protruding edge together form a positioning structure capable of fastening the plug assembly.

Preferably, the positioning structure includes several tooth positions formed at an end surface of the protruding edge, and the positioning plate forms several positioning bumps corresponding to the tooth positions.

Preferably, the limiting groove is in a semi-arc shape to restrict the plug assembly to only rotating within a range of 0° to 180° relative to the plugboard seat.

Preferably, the rotating seat and the positioning plate have several corresponding fastening holes formed therebetween, and are locked and connected to each other by fasteners.

Preferably, corresponding mounting posts and mounting holes are further formed between the rotating seat and the positioning plate.

Preferably, a through groove is formed in a center of the positioning plate.

Preferably, the plug assembly is one of an American standard plug, a British standard plug, a European standard plug, or a Chinese standard plug.

Compared with the prior art, the present invention has at least the following benefits:

1. The plugboard seat and the plug assembly can rotate relatively, so that the extension plugboard has higher environmental compatibility.

2. The positioning structure that can fasten the plugboard seat and the plug assembly to each other is provided to prevent the plugboard seat and the plug assembly from moving freely.

Figure 1:
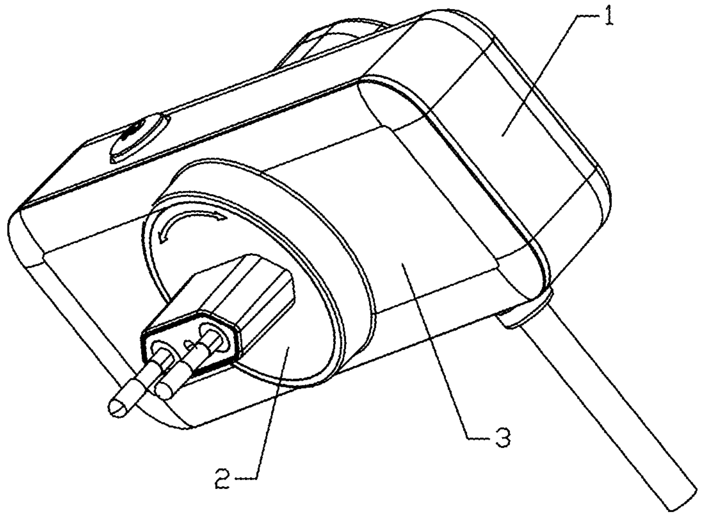
FIG. 1 is a schematic diagram of a structure of the present invention.
Figure 2:
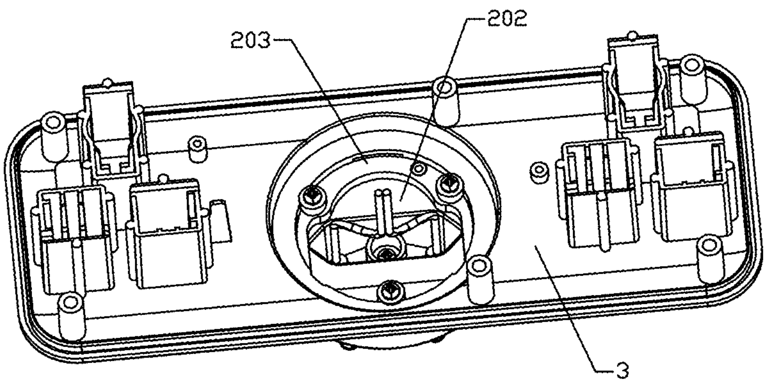
FIG. 2 is a schematic assembly diagram of a plug assembly.

In the figures, 1—Plugboard seat; 2—Plug assembly; 201—Pin; 202—Rotating seat; 212—Limiting tooth; 203—Positioning plate; 213—Positioning bump; 223—Through groove; 3—Backplane; 301—Boss; 311—Protruding edge; 321—Limiting groove; 331—Tooth position.

DETAILED DESCRIPTION OF THE EMBODIMENTS

The technical solutions in embodiments of the present invention are described below clearly and completely with reference to the accompanying drawings in the embodiments of the present invention. Clearly, the described embodiments are merely some, rather than all of the embodiments of the present invention. All other embodiments derived from the embodiments of the present invention by those of ordinary skill in the art without creative efforts shall fall within the protection scope of the present invention.

As shown in FIG. 1 to FIG. 6, a rotatable extension plugboard includes a plugboard seat 1, and a plug assembly 2 is mounted in a boss 301 that has an inner cavity and that is formed at a backplane 3 of the plugboard seat 1. A positive wire and a negative wire of a pin 201 of the plug assembly are interconnected with a circuit assembly inside the plugboard seat 1. The plug assembly 2 can rotate relative to the plugboard seat 1 in the boss 301, so that the plugboard seat 1 can be mounted in different indoor environments.

Figure 3:
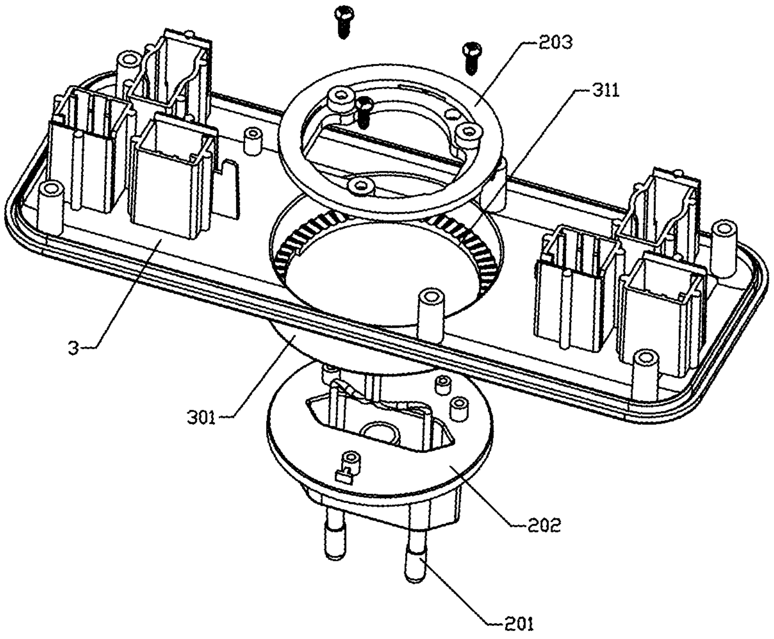
FIG. 3 is a schematic exploded view of FIG. 2.
Figure 4:
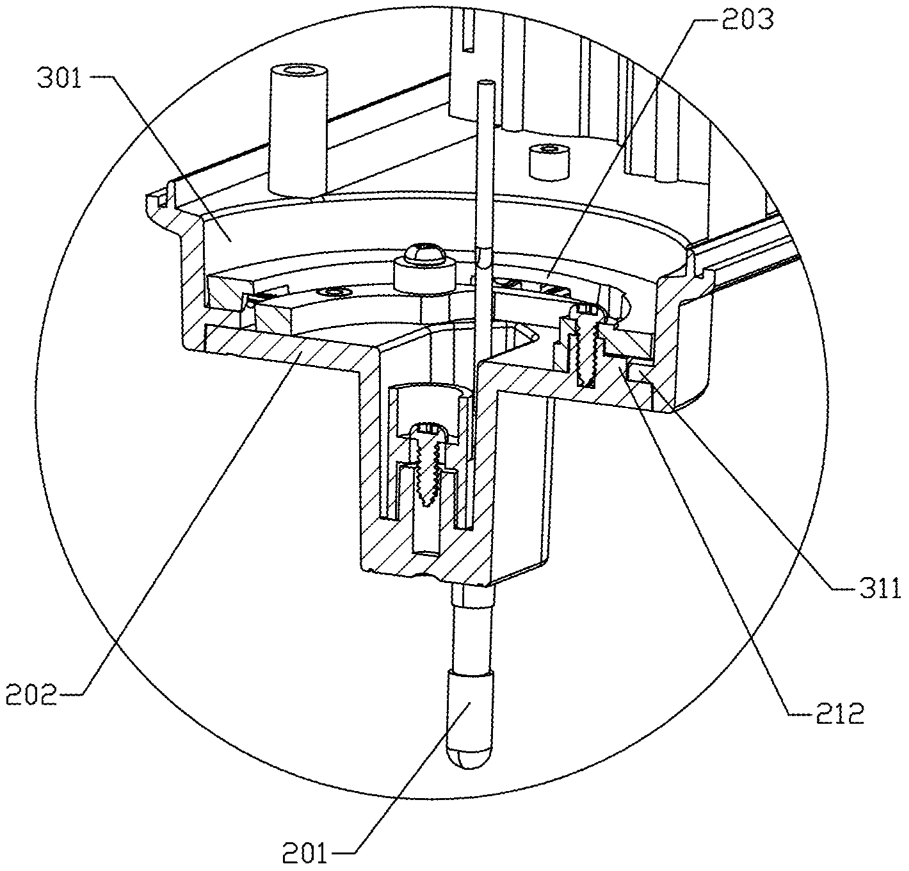
FIG. 4 is a schematic sectional view of FIG. 2.
Figure 5:
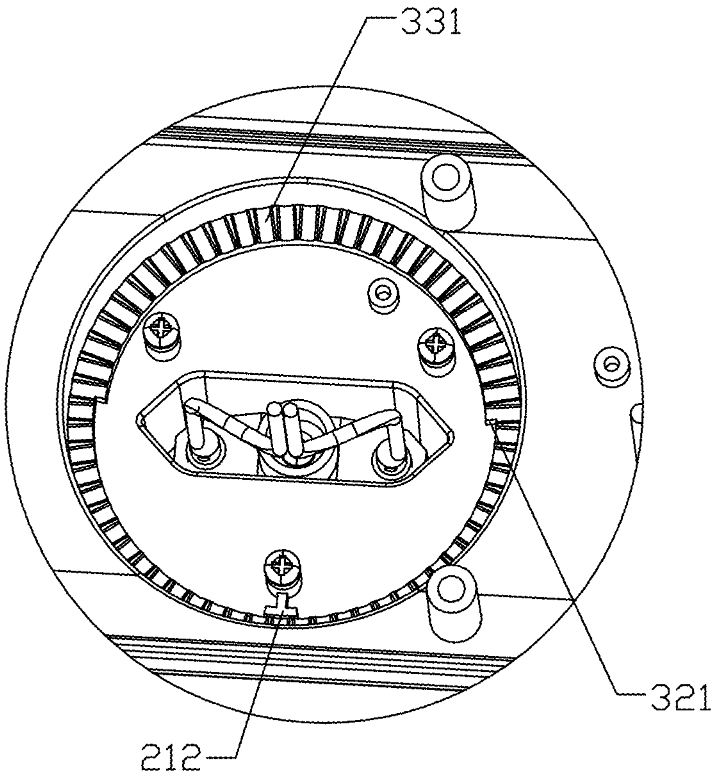
FIG. 5 is a schematic diagram of engagement between a limiting tooth and a limiting groove.

Further, the rotary motion of the plug assembly 2 is implemented mainly by a rotating seat 202 provided on the plug assembly. As shown in FIG. 3 and FIG. 5, an inner wall of the boss 301 protrudes to form a circle of protruding edge 311, and the protruding edge 311 is provided with a semi-arc-shaped limiting groove 321. After the rotating seat 202 is inserted into the boss 301 from the outside and abuts against a side of the protruding edge 311, a limiting tooth 212 provided at an edge of the rotating seat 202 is located in the limiting groove 321. Since the limiting tooth 212 is limited by a left end and a right end of the limiting groove 321, the plug assembly 2 can only rotate within a range of 0° to 180° as a whole.

Furthermore, after relatively rotating, the plug assembly 2 and the plugboard seat 1 further need to be positioned to ensure their structural stability. Therefore, the plug assembly 2 is further provided with a positioning plate 203. In the assembly process of this design, when the rotating seat 202 is inserted into the boss 301 from the outside of the backplane 3, the positioning plate 203 is also inserted into the boss 302 from the inside of the backplane 3. After the rotating seat and the positioning plate are fitted by a mounting post and a mounting hole, fastening holes thereof can be aligned with each other. In this case, a screw is used as a fastener to fasten and connect the rotating seat and the positioning plate to form a whole.

Figure 6:
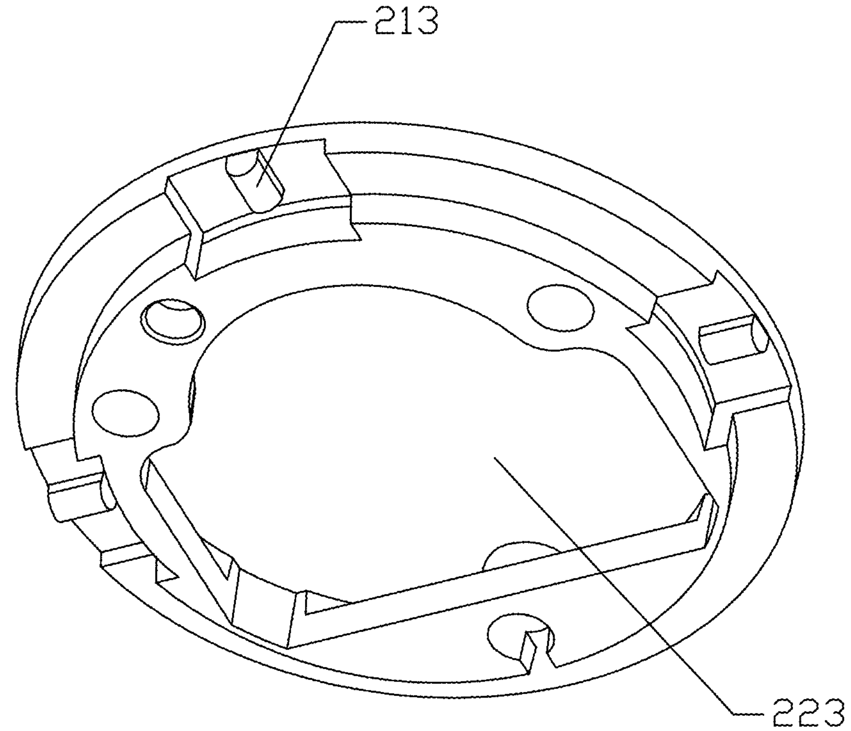
FIG. 6 is a schematic diagram of a structure of a positioning plate.

Specifically, a positioning function is implemented by a positioning structure formed between the positioning plate 203 and the protruding edge 311. As shown in FIG. 5 and FIG. 6, the annular protruding edge 311 forms several arc-shaped tooth positions 331 on a side thereof facing the positioning plate 203, and three positioning bumps 213 corresponding to the shapes of the tooth positions 331 are formed at an edge of the positioning plate 203. As the entire positioning plate 203 is preferably made of plastic, the positioning bumps 213 can be positioned and matched with different tooth positions 331 through deformation when artificially twisted, so that the rotated plug assembly 2 is relatively fastened with the plugboard seat 1.

Specifically, a through groove 223 is further formed in a center of the positioning plate 203, and a wire for connecting the pin 201 to the circuit assembly inside the plugboard seat 1 passes through the through groove 223.

Specifically, the plug assembly 2 may be any one of an American standard plug, a British standard plug, a European standard plug, or a Chinese standard plug, and the pin 201 of the plug assembly is mounted on the rotating seat 202.

As mentioned above, an extension plugboard in an existing design may not be mounted or used since there are foreign objects around a power socket. For example, in general, a wall with a desk inside a room is correspondingly equipped with a power socket above the desk, and if a distance between the power socket and the desk is too small, the extension plugboard cannot be plugged into the power socket because a bottom end thereof is blocked by the desk. In this design, a direction of the plugboard seat can be changed by rotating the plug assembly, so that the extension plugboard can be normally plugged into the power socket for use. Compared with a conventional design, the extension plugboard in this design allows a user to make autonomous adjustments according to different indoor environments, thus having higher environmental compatibility.

It can be understood that the present invention is described through some embodiments, and those skilled in the art are aware that various changes or equivalent substitutions can be made to these features and embodiments without departing from the spirit and scope of the present invention. In addition, under the motivation of the present invention, these features and embodiments can be modified to adapt to specific situations and materials without departing from the spirit and scope of the present invention. Therefore, the present invention is not limited by the specific embodiments disclosed herein, and all embodiments falling within the scope of the claims of the present application fall within the scope protected by the present invention.

What is claimed is:

1. A rotatable extension plugboard, comprising a plugboard seat (1) and a plug assembly (2), wherein a boss (301) with an inner cavity is formed at a backplane (3) of the plugboard seat (1), the plug assembly (2) is mounted on the boss (301) through a rotating seat (202) provided on the plug assembly, a limiting tooth (212) is formed on an upper surface of the rotating seat (202) and a limiting groove (321) is formed on an inner circumferential edge of a protruding edge (311) on an inner wall of the boss (301), and the plug assembly (2) is rotatable in a limiting manner relative to the plugboard seat (1) through engagement between the limiting tooth (212) and the limiting groove (321);

wherein the limiting groove (321) is in a semi-arc shape to restrict the plug assembly (2) to only rotate within a range of 0° to 180° relative to the plugboard seat (1);

the plug assembly (2) is provided with a positioning plate (203) mutually fastened with the rotating seat (202), the protruding edge (311) located between the positioning plate (203) and the rotating seat (202), the positioning plate (203) and the protruding edge (311) together form a positioning structure capable of fastening the plug assembly (2), the positioning structure comprises several tooth positions (331) formed at a surface of the protruding edge (311) facing the positioning plate (203), and an opposite surface of the positioning plate (203) forms several positioning bumps (213) corresponding to the tooth positions (331);

wherein the entire positioning plate (203) is made of plastic, the positioning bumps (213) can be positioned and matched with different tooth positions (331) through deformation when artificially twisted, so that the rotated plug assembly (2) is relatively fastened with the plugboard seat (1).

2. The rotatable extension plugboard according to claim 1, wherein the rotating seat (202) and the positioning plate (203) have several corresponding fastening holes formed therebetween, and are locked and connected to each other by fasteners.

3. The rotatable extension plugboard according to claim 2, wherein several corresponding mounting posts and mounting holes are further formed between the rotating seat (202) and the positioning plate (203).

4. The rotatable extension plugboard according to claim 1, wherein a through groove (223) is formed in a center of the positioning plate (203).

5. The rotatable extension plugboard according to claim 1, wherein the plug assembly (2) is one of an American standard plug, a British standard plug, a European standard plug, or a Chinese standard plug.

* * * * *